United States Patent [19]

Uchiyama et al.

[11] Patent Number: 5,273,131
[45] Date of Patent: Dec. 28, 1993

[54] VIBRO-ISOLATING SUPPORT STRUCTURE FOR ENGINE OF INDUSTRIAL VEHICLE

[75] Inventors: Yukio Uchiyama; Satoshi Matsuda; Shuuichi Miyazaki, all of Sagamira, Japan

[73] Assignee: Mitsubishi Jukogyo Kabushiki Kaisha, Tokyo, Japan

[21] Appl. No.: 836,586

[22] Filed: Feb. 18, 1992

[30] Foreign Application Priority Data

Feb. 28, 1991 [JP] Japan .................. 3-10098

[51] Int. Cl.⁵ .................................. B60K 5/12
[52] U.S. Cl. ......................... 180/293; 180/291; 180/300
[58] Field of Search ............ 180/291, 293, 300, 299

[56] References Cited

U.S. PATENT DOCUMENTS

| | | | |
|---|---|---|---|
| 2,311,303 | 2/1943 | Collins | 180/291 |
| 3,052,312 | 8/1962 | Cadiou | 180/54 |
| 3,387,682 | 6/1968 | Jaskowiak | 180/291 |
| 3,773,132 | 11/1973 | Gawlik et al. | 180/291 |
| 4,186,714 | 2/1980 | Danckert et al. | 180/291 |
| 4,508,072 | 4/1985 | Takami et al. | 180/291 |
| 4,667,764 | 10/1987 | Sawada et al. | 180/197 |

FOREIGN PATENT DOCUMENTS

| | | | |
|---|---|---|---|
| 574250 | 4/1959 | Canada | 180/291 |
| 736639 | 6/1943 | Fed. Rep. of Germany | 180/291 |
| 1939295 | 2/1971 | Fed. Rep. of Germany | |
| 3239457 | 4/1984 | Fed. Rep. of Germany | 180/291 |

*Primary Examiner*—Eric D. Culbreth
*Attorney, Agent, or Firm*—Nixon & Vanderhye

[57] ABSTRACT

It is an object of the present invention to prevent an engine of an industrial vehicle from transmitting vibration thereof to a frame via an axle housing. Further, a cylindrical crosswise rubber vibration isolator is made to intervene between an engine and a vehicle frame, an output shaft of a transmission and an input shaft of a transfer are connected by a universal joint, a cylindrical crosswise rubber vibration isolator is also made to intervene between the transmission and the transfer, and brackets 33 and 34 of the rubber vibration isolator 32 are fastened together with a transmission cover 26 and a transfer cover 27, respectively.

3 Claims, 9 Drawing Sheets

DISPLACEMENT →

VIBRO-ISOLATING SUPPORT STRUCTURE FOR ENGINE OF INDUSTRIAL VEHICLE

FIELD OF THE INVENTION AND RELATED ART STATEMENT

The present invention relates to a structure of an apparatus for supporting an engine of an industrial vehicle such as a fork lift truck in a vibro-isolating manner.

Figure 11:
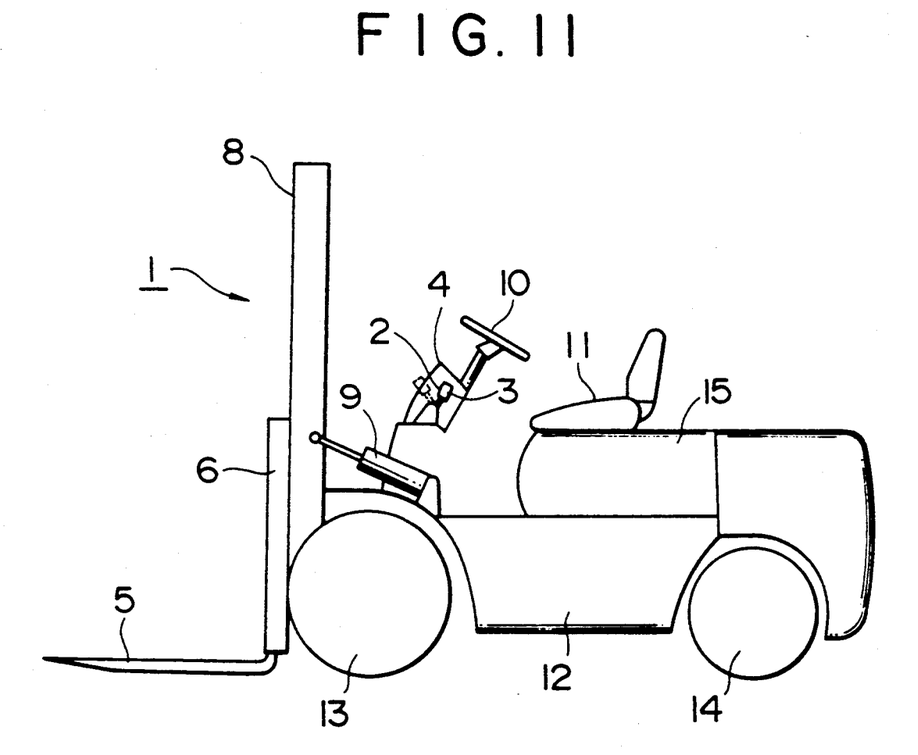
FIG. 11 is a sketch drawing of a fork lift truck.

FIG. 11 shows an external appearance of a fork lift truck as an example of an industrial vehicle. In FIG. 11, a fork 5 of a fork lift truck 1 is fitted to a bracket 6 and ascends and descends along a mast 8. The mast 8 ascends and descends by means of a lift cylinder not shown, and tilts fore and aft by means of a tilt cylinder 9. Reference numeral 2 represents a parking brake lever, 3 represents a grip thereof, 4 represents a console box, 10 represents a handle, 11 represents a driver's seat, 12 represents a body, 13 represents a front wheel, 14 represents a rear wheel and 15 represents an engine cover.

Figure 12:
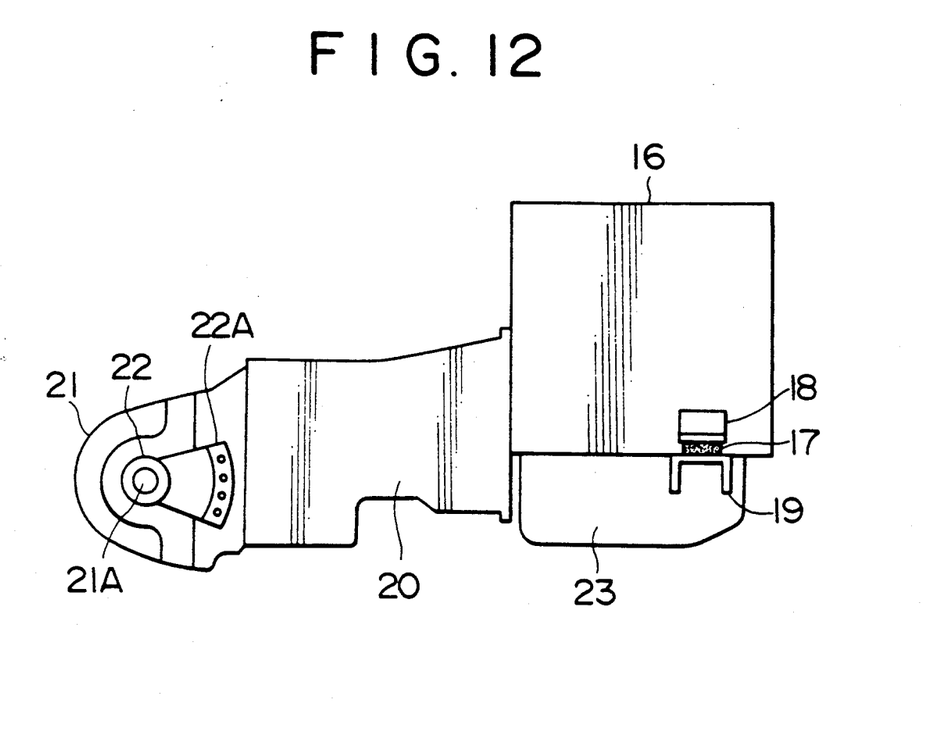
FIG. 12 is a side view showing a conventional vibro-isolating support structure.
Figure 13:
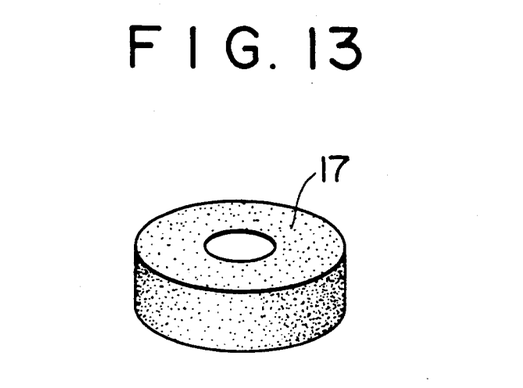
FIG. 13 is a perspective view of the rubber vibration isolator shown in FIG. 12.

FIG. 12 shows a conventional engine support structure in the fork lift truck 1. Further, FIG. 13 shows a rubber vibration isolator 17 which has been heretofore used. The rubber vibration isolator 17 has a simple cylindrical form, and intervenes lengthwise (i.e., such that the axis points to a vertical direction) between respective L-shaped brackets 18 fitted to both side faces of an engine 16 and respective U-shaped brackets 19 fitted to a body frame.

On the other hand, a transmission 20 and a front axle housing 21 are coupled with the engine 16 in this order, and an axle support 22 supporting the axle housing 21 is coupled tightly with a body frame by bolts at a sector section 22A thereof. 21A represents an axle shaft, and 23 represents an oil pan.

In such a vehicle, the vibration of the engine 16 is transmitted to the axle housing 21 and the axle shaft 21A through the transmission 20, and transmitted to the body frame therefrom. Therefore, vibration is transmitted to the handle 10 and the driver's seat 11, and thus, the operator may feel unpleasant vibrations.

Further, although the engine 16 itself is supported through the rubber vibration isolator 17, the rubber vibration isolator 17 is of a simple cylindrical form and it is merely installed lengthwise (its axis points to a vertical direction). Thus, the vibro-isolating effect is small, and hence, still further improvement is needed.

OBJECT AND SUMMARY OF THE INVENTION

It is an object of the present invention to provide a vibro-isolating support structure for an engine of an industrial vehicle in which above-described problems of prior art are solved.

A vibro-isolating support structure for an engine of an industrial vehicle according to the present invention comprises a cylindrical crosswise rubber vibration isolator made to intervene between an engine and a body, a universal joint connected between an output shaft of a transmission and an input shaft of a transfer coupled with an axle, and a cylindrical crosswise rubber vibration isolator made to intervene between a transmission case and a transfer case.

The cylindrical crosswise rubber vibration isolator (arranged so that the axis of the cylinder is in a horizontal position) absorbs vibration of the engine by shearing force. Further, the cylindrical crosswise rubber vibration isolator can provide a spring constant optimum for vibro-isolating support according to its shape given at the time of molding, and give a stopper function for regulating maximum displacements in vertical and horizontal directions, respectively, easily. Hence, the vibro-isolating effect is high as compared with a conventional cylindrical lengthwise isolator (arranged so that the axis of the cylinder is in a vertical direction).

Further, the cylindrical crosswise rubber isolator is made to intervene not only between the engine and the body, but also between the transmission case and the transfer case, and the output shaft of the transmission and the input shaft of the transfer are connected through a universal joint. Accordingly, the vibration of the engine is no longer transmitted to the body frame through the transmission.

Furthermore, covers of respective cases and brackets of cylindrical crosswise rubber vibration isolators are fastened together on the transmission and the transfer, thus obtaining a simple structure.

BRIEF DESCRIPTION OF THE DRAWINGS

FIG. 5($a$) and 5($b$) shows cross-sectional views of a cylindrical crosswise rubber vibration isolator;

FIG. 10($a$) and 10($b$) show a structure of a bracket of a cylindrical crosswise rubber vibration isolator between the transmission case and the transfer case shown in FIG. 8;

DETAILED DESCRIPTION OF PREFERRED EMBODIMENTS

The present invention will be described in detail with reference to embodiments shown in FIG. 1 to FIG. 10.

Figure 1:
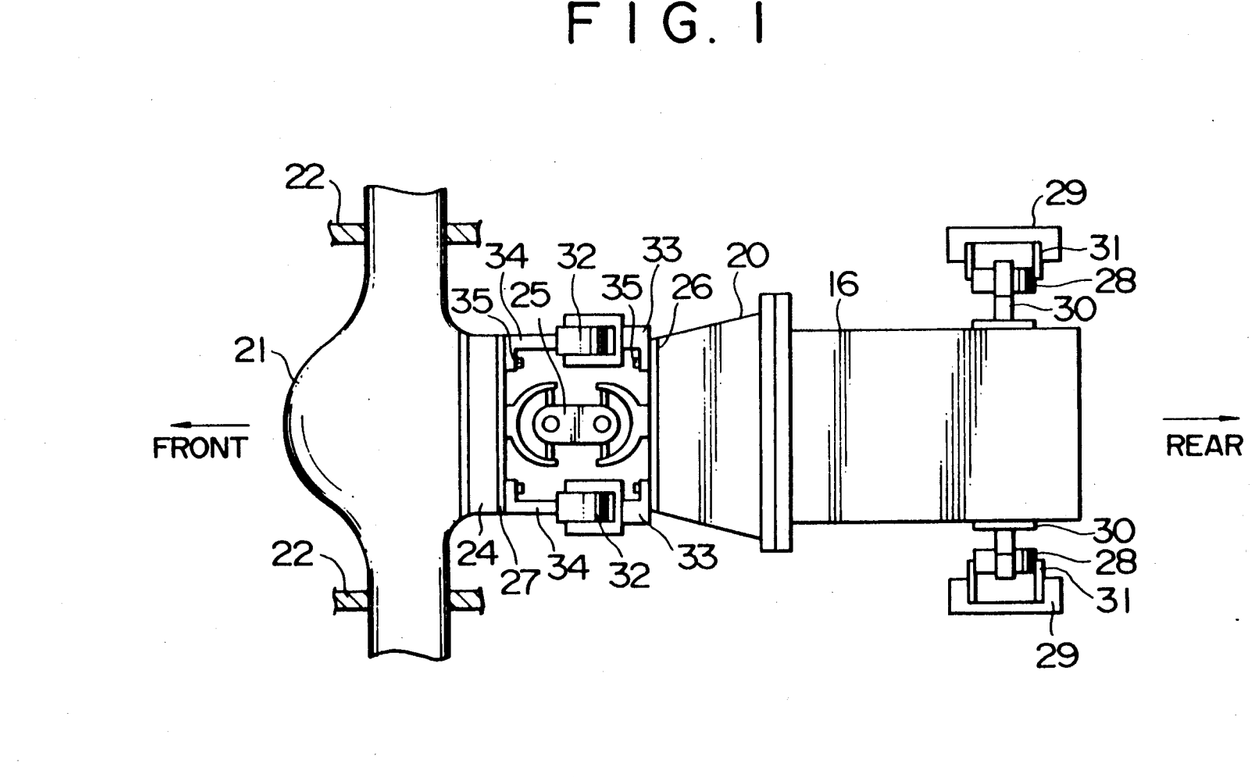
FIG. 1 is a plan view showing an embodiment of the present invention.
Figure 2:
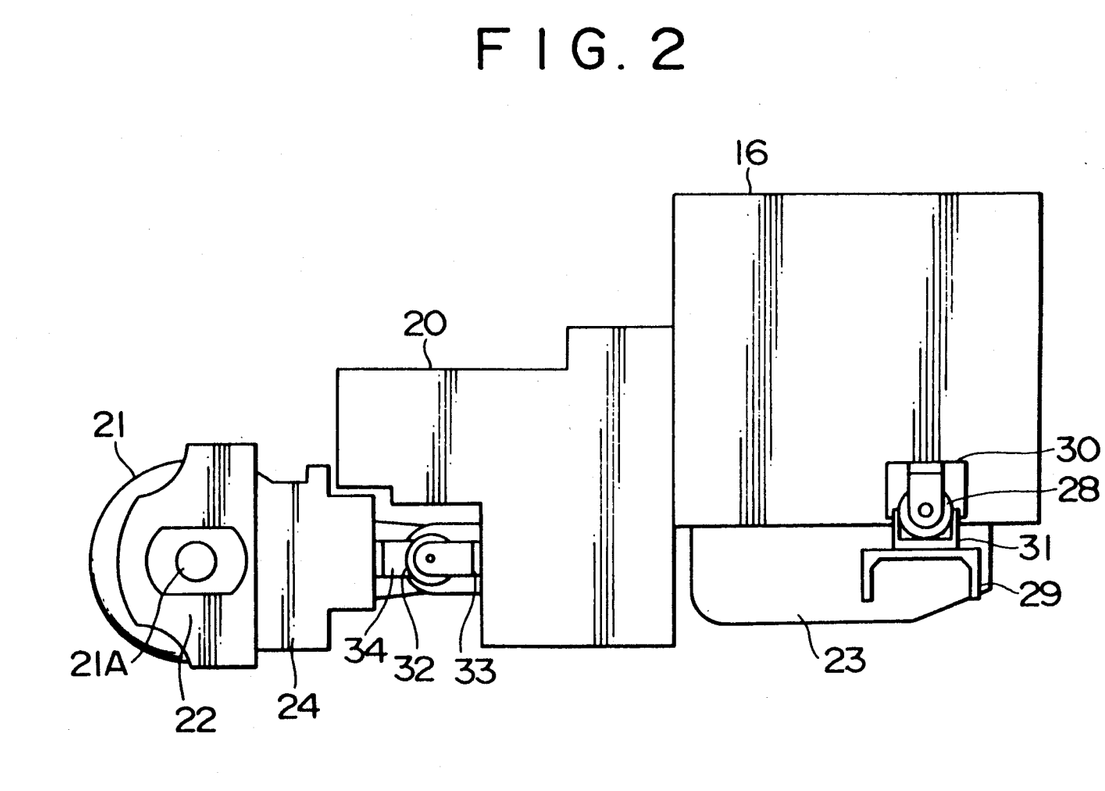
FIG. 2 is a view seeing FIG. 1 from the side thereof.

FIG. 1 shows an embodiment of the present invention in a plan view. A transmission case 20 is coupled with an engine 16. A transfer 24 is coupled with a front axle. The output shaft of the transmission 20 and the input shaft of the transfer 24 are connected with each other by a cross universal joint 25. 26 represents a cover disposed at the end portion of the transmission 20, and 27 represents a cover disposed at the end portion of the transfer 24. FIG. 2 shows a view showing the embodiment from its side.

Further, one cylindrical crosswise rubber vibration isolator 28 is disposed on either side of the engine 16 with respect to front and back directions of the vehicle so as to intervene between a body frame 29 and the engine 16. 30 and 31 represent mounting brackets of the rubber vibration isolators 28, and are fixed to the engine 16 and the frame 29 by bolts, respectively.

Further, one cylindrical crosswise rubber vibration isolator 32 is disposed on either side with respect to the universal joint 25 so as to intervene between the transmission 20 and the transfer 24, too. Mounting brackets 33 and 34 of these rubber vibration isolators 32 are fastened to the transmission 20 together with a cover 26 thereof and to the transfer 24 together with a cover 27 thereof by bolts 35.

The respective rubber vibration isolators 28 and 32 are disposed so that their axes are perpendicular to the longitudinal direction of the vehicle A front axle housing 21 is fixed to the body frame by an axle support 22.

Next, the cylindrical crosswise rubber vibration isolators 28 and 32 will be described in detail.

Figure 3:
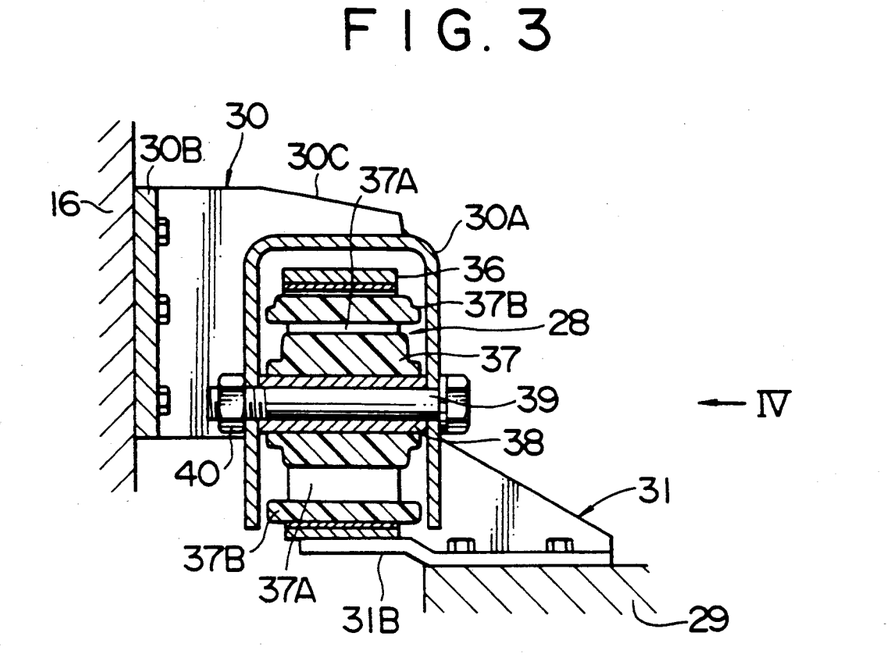
FIG. 3 is a longitudinal sectional view of a cylindrical crosswise rubber vibration isolator between the engine and the frame shown in FIG. 1.
Figure 4:
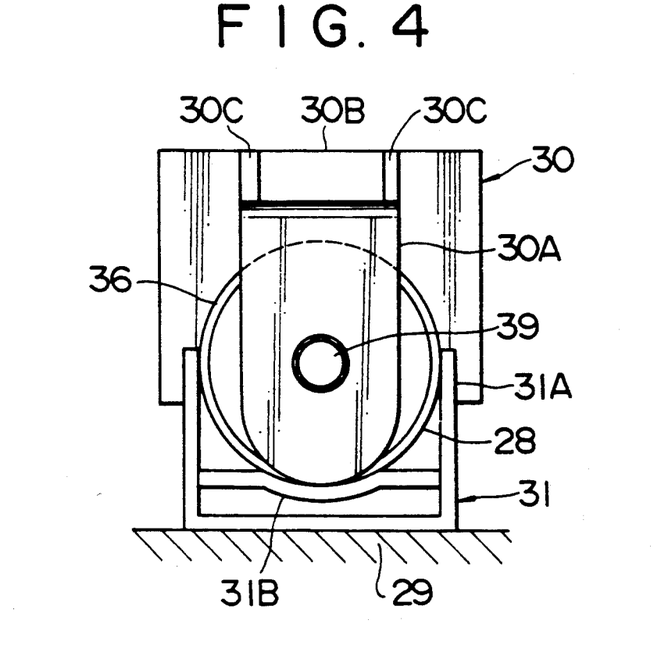
FIG. 4 is a view in the direction IV shown in FIG. 3.

FIG. 3 shows a cross-sectional structure of the rubber vibration isolator 28 mounted on the engine 16, and FIG. 4 is a view in the direction of IV in FIG. 3 The rubber vibration isolator 32 between the transmission 20 and the transfer 24 has basically the same structure as above, and only the configuration of the bracket is different slightly.

In FIG. 3 and FIG. 4, a rubber compact 37 is fixed in a ring 36 made of metal such as steel, and pipe 38 is fixed in the rubber compact 37. Two gap sections 37A penetrate through the rubber compact 37 as the compact is molded. Further, rubber sections 37B for stopper are molded on the side of the ring 36 facing the gap sections 37A. Both ends of these rubber sections 37B for stopper project slightly from the ring 36.

Further, the rubber vibration isolator 28 is fixed to a U-shaped support 30A of a bracket 30 for the engine by bolts 39 penetrating through the pipe 38 and nuts 40. This support 30A is welded to a rib 30C of a bracket body 30B.

On the other hand, a pointed end of a bracket 31 for the frame has a U shape. This U-shaped pointed end section 31A is fixed to the outer periphery of the ring 36 of the rubber vibration isolator 28. 31B represents a support section having a depression midway.

Figure 5A:
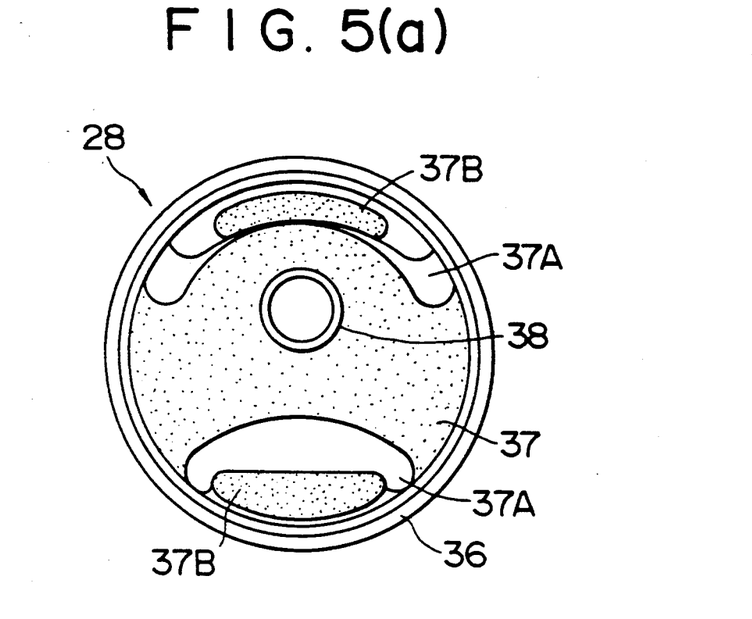
Figure 5B:
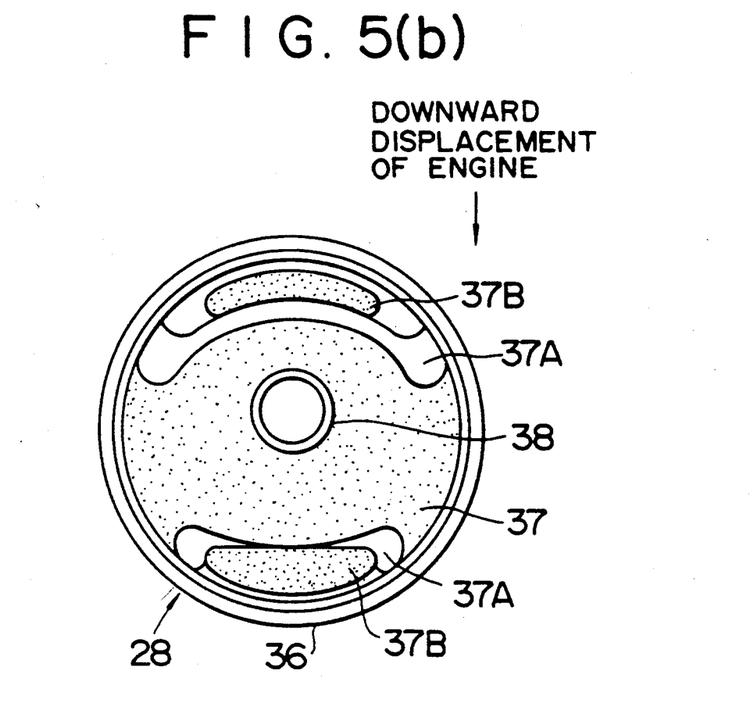
Figure 6:
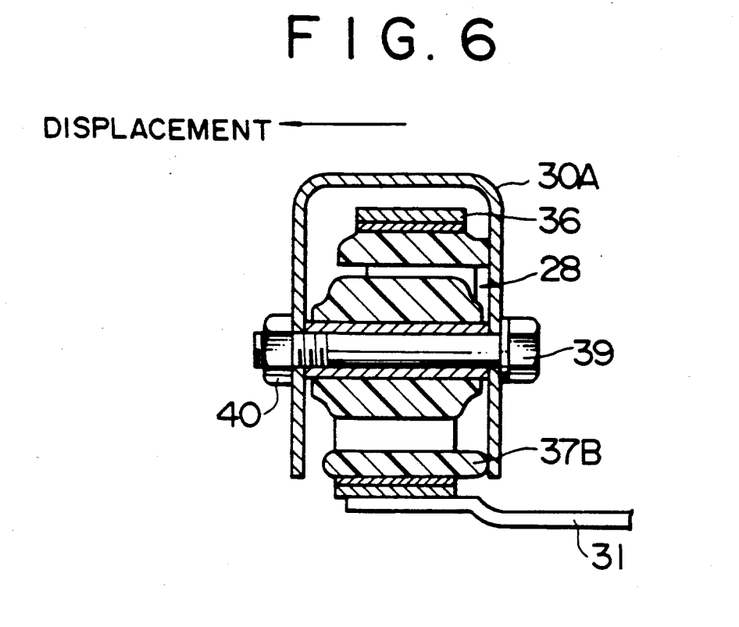
FIG. 6 is a view showing the operation of a cylindrical crosswise rubber vibration isolator against axial displacement.

The rubber vibration isolators 28 and 32 are used so that one of the two gap sections 37A is positioned above the other, and the pipe 38 is positioned a little above the center of the ring 36 in a free state as shown in FIG. 5 (a). Further, it is designed so that the pipe 38 goes down so as to be positioned at the center of the ring 36 in a loaded state where the engine is mounted. With this, the vertical vibration of the engine is absorbed effectually by the shearing force of the rubber compact 37 as shown in FIG. 5 (b). The crosswise vibration of the engine is absorbed through deformation as shown in FIG. 6. Also, when the crosswise vibration is large, the pointed end of the rubber section 37B projecting as a stopper abuts against the U-shaped support 30A of the bracket for the engine, thereby to delimit the maximum displacement without undue shocks.

Figure 7:
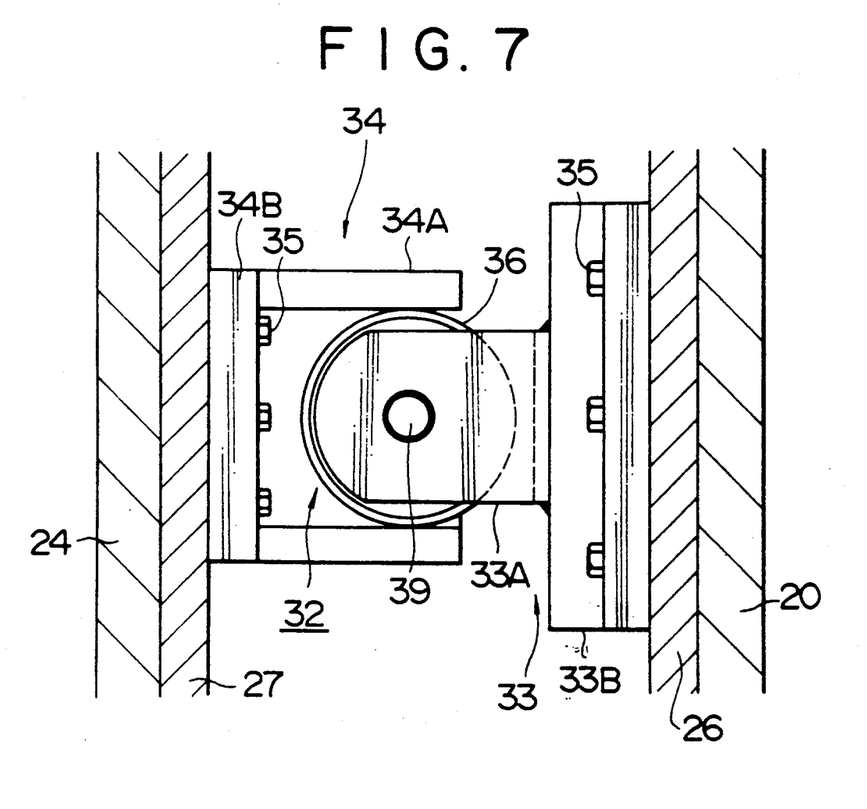
FIG. 7 is a view showing a structure of a bracket of a cylindrical crosswise rubber vibration isolator between the transmission case and the transfer case shown in FIG. 1.

FIG. 7 shows a structure of a bracket of the rubber vibration isolator 32 between the transmission 20 and the transfer 24. A U-shaped support 33A of a bracket 33 for the transmission is fixed to a pipe at the center of the rubber vibration isolator 32 by a bolt 39. This support 33A is welded to a bracket body 33B having an L shape. This bracket body 33B is fixed to the transmission 20 together with the transmission case 26 by bolts 35. Further, a U-shaped pointed portion 34A of a bracket 34 for the transfer is fixed to a ring 36 on the outer periphery of the rubber vibration isolator 32. The bracket body 34B is fixed to the transfer 24 together with the transfer case 27 by bolts 35.

In the next place, another embodiment of the present invention will be described with reference to FIG. 8 to FIG. 10(b).

Figure 8:
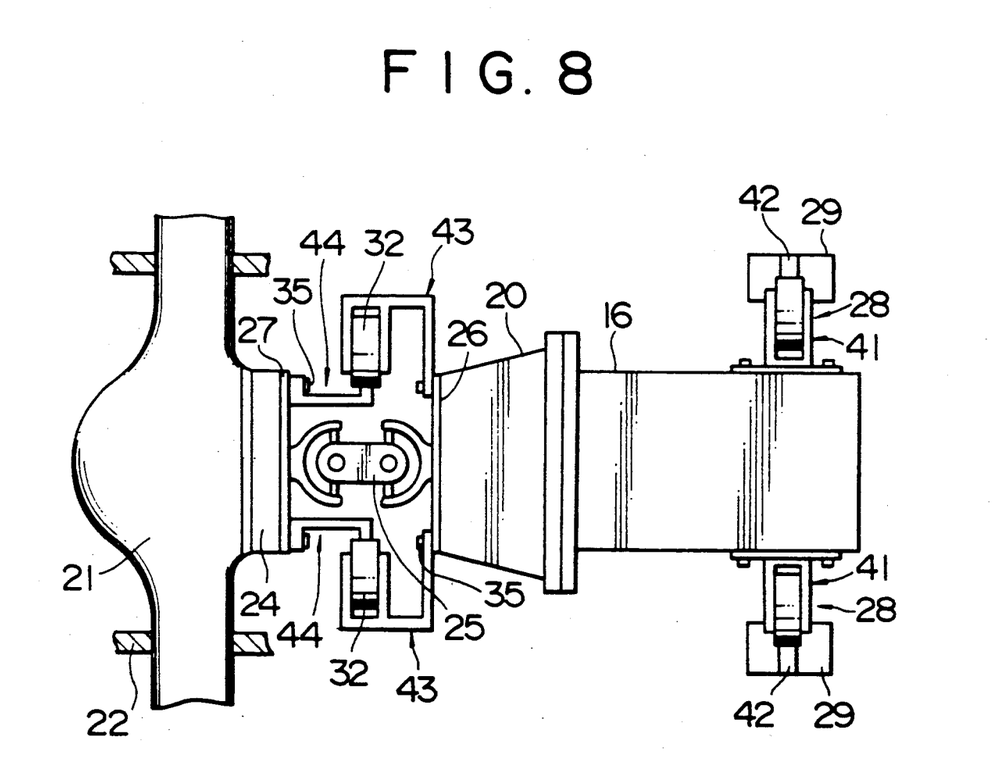
FIG. 8 is a plan view showing another embodiment of the present invention.

FIG. 8 shows another embodiment in a plan view. The embodiment shown in FIG. 8 includes four cylindrical crosswise rubber vibration isolators 28 and 32 arranged so that their axial directions are in parallel with the longitudinal direction of the vehicle body, and differs from the previous embodiment shown in FIG. 1 in the point described above. Thus, these embodiments differ only in the bracket structures of respective rubber vibration isolators 28 and 32. The other members and the like are the same, and hence, the same symbols are assigned and duplicate description is omitted herein.

Figure 9:
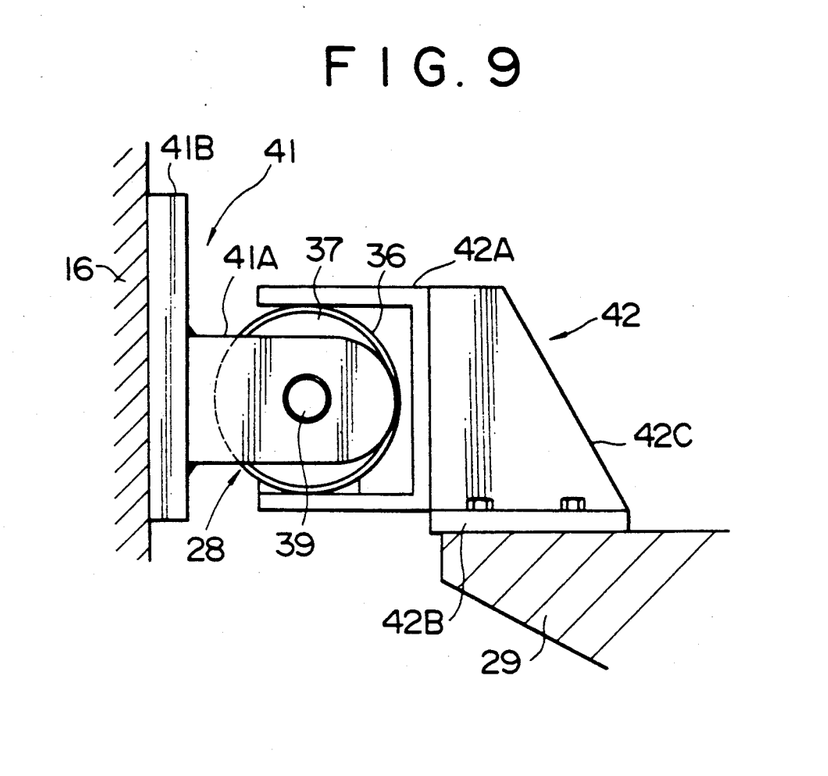
FIG. 9 is a view showing a structure of a bracket of a cylindrical crosswise rubber vibration isolator between the engine and the frame shown in FIG. 8.

FIG. 9 shows brackets 41 and 42 for mounting a rubber vibration isolator 28 between the engine 16 and the frame 29. A U-shaped support 41A of the bracket 41 for the engine is fixed sideways to a pipe at the center of the rubber vibration isolator 28 by a bolt 39. This support 41A is welded to an L-shaped bracket body 41B. This bracket body 41B is fixed to the engine 16 by bolts.

In the bracket 42 for the frame, a U-shaped pointed end section 42A is fixed to a ring 36 on the outer periphery of the rubber vibration isolator 28, and a T-shaped bracket body 42B having a rib 42C is fixed to the frame 29 by bolts.

Figure 10A:
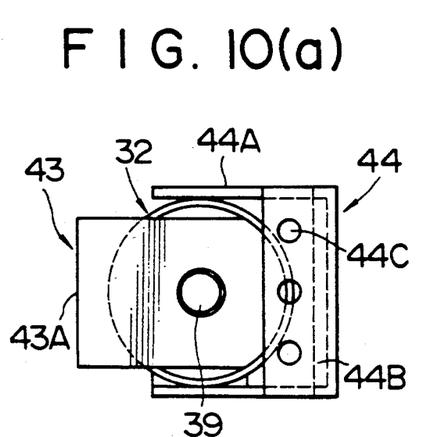
Figure 10B:
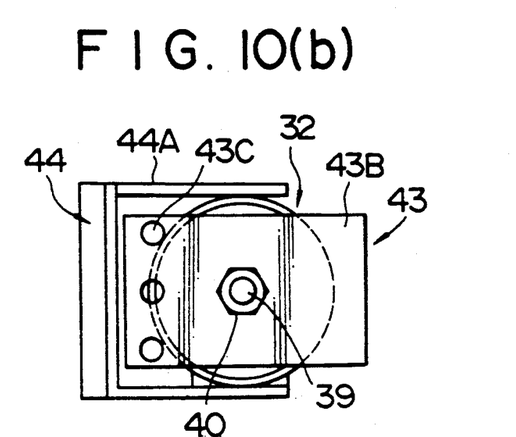

FIGS. 10(a) and 10(b) show brackets 43 and 44 for mounting a rubber vibration isolator 32 between the transmission 20 and the transfer 24 The bracket 43 for the transmission has a transverse U-shaped support 43A. The rubber vibration isolator 32 is fixed to the U-shaped support 43A by a bolt 38 inserted through a central pipe of the rubber vibration isolator 32. The transverse U-shaped support 43A has an L-shaped section 43B, and is fastened together with the transmission cover 26 by using holes bored at the pointed end of this L-shaped section 43B. Bolting operation is performed in a space between the U-shaped support 43A and the L-shaped section 43B.

The bracket 44 for the transfer has a U-shaped pointed end section 44A, and the outer peripheral ring 36 of the rubber vibration isolator 32 is fixed to this U-shaped pointed end section 44A. The bracket 44 extends from the back of a U-shaped pointed end section 44A to include a U-shaped section 44B, and is fastened together with the transfer cover 27 by using holes 44C bored at the U-shaped section 44B. Then, bolting operation is performed in a space secured by the U-shaped section 44B.

According to the present invention, vibro-isolating operation is very effectual by adopting the cylindrical crosswise rubber vibration isolator. Furthermore, by connecting, not only between the engine and the frame, but also the output shaft of the transmission and the input shaft of the transfer with a universal joint and by having a rubber vibration isolator intervene also between these transmission and transfer, it is also possible to prevent the vibration of the engine from transmitting to the frame through the axle housing and the like. Further, due to the structure that respective covers of the transmission and the transfer and the bracket of the rubber vibration isolator are fastened together, the structure is simplified.

We claim:

1. A vibro-isolating support structure for an engine on a front engine, front wheel drive industrial vehicle comprising:

a first cylindrical crosswise rubber vibration isolator made to intervene between the front engine and a vehicle body;

a universal joint connected between an output shaft of a transmission coupled with the engine and an input shaft of a transfer coupled with a front axle; and a second cylindrical crosswise rubber vibration isolator made to intervene between the transmission and the transfer, wherein:

the transmission and the transfer have a cover at a respective end section;

brackets are fastened to the covers of said transmission and said transfer by bolts; and said second cylindrical crosswise rubber vibration isolator is disposed between said brackets.

2. A vibro-isolating support structure for an engine on an industrial vehicle comprising:

a first cylindrical crosswise rubber vibration isolator made to intervene between the engine and a vehicle body;

a universal joint connected between an output shaft of a transmission coupled with the engine and an input shaft of a transfer coupled with an axle;

a second cylindrical crosswise rubber vibration isolator made to intervene between the transmission and the transfer;

a bracket attached to said transmission;

a bracket attached to said transfer, said second cylindrical crosswise rubber vibration isolator interposed between said transmission bracket and said transfer bracket.

3. A vibro-isolating support structure for an engine on an industrial vehicle comprising:

a first cylindrical crosswise rubber vibration isolator made to intervene between the engine and a vehicle body;

a universal joint connected between an output shaft of a transmission coupled with the engine and an input shaft of a transfer coupled with an axle;

a second cylindrical crosswise rubber vibration isolator made to intervene between the transmission and the transfer, wherein the transmission and the transfer have a cover at a respective end section;

brackets are fastened to the covers of said transmission and said transfer by bolts; and said second cylindrical crosswise rubber vibration isolator is disposed between said brackets.

* * * * *